United States Patent [19]

Vossen, Jr. et al.

[11] 4,004,080

[45] Jan. 18, 1977

[54] METAL COATING FOR VIDEO DISCS

[75] Inventors: John L. Vossen, Jr., Bridgewater, N.J.; Frederick Russell Nyman, Carmel, Ind.; Dennis Glendon Fisher, Titusville, N.J.; George Frederick Nichols, Oaklandon, Ind.

[73] Assignee: RCA Corporation, New York, N.Y.

[22] Filed: July 25, 1975

[21] Appl. No.: 599,129

[52] U.S. Cl. .................. 358/128; 179/100.1 B; 428/65; 428/461; 75/171; 75/128 R
[51] Int. Cl.² .................. H04N 1/28; B32B 3/02
[58] Field of Search ............ 428/64, 65, 447, 450, 428/461, 457; 178/6.6 DD; 358/6; 75/171; 29/183.5, 193

[56] References Cited

UNITED STATES PATENTS

| | | | |
|---|---|---|---|
| 3,645,726 | 2/1972 | Copson et al. | 75/171 |
| 3,649,187 | 3/1972 | Fisher | 75/171 |
| 3,649,258 | 3/1972 | Zukas et al. | 75/171 |
| 3,842,194 | 10/1974 | Clemens | 178/6.6 A |
| 3,843,399 | 10/1974 | Kaplan et al. | 179/100.41 R |

*Primary Examiner*—George F. Lesmes
*Assistant Examiner*—William R. Dixon, Jr.
*Attorney, Agent, or Firm*—Glenn H. Bruestle; Birgit E. Morris

[57] ABSTRACT

An improved metal coating for a video disc of a grooved polymer disc, a conductive metal coating thereon and a dielectric coating on said metal coating, wherein said metal coating comprises a film of a pseudoalloy composition of an alloy of nickel and chromium and, optionally, iron, containing from about 10 to about 25 atomic percent of oxygen admixed with from about 10 to 15 atomic percent of copper.

8 Claims, No Drawings

METAL COATING FOR VIDEO DISCS

REFERENCE TO RELATED APPLICATIONS

This application is an extension of the subject matter described in application of Vossen et al "Improvement in Adherence of Metal Films to Polymeric Materials" Ser. No. 599,130 and an alternate to the subject matter in application of Nyman et al. "Improved Metal Coating for Video Discs" Ser. No. 599,128, now U.S. Pat. No. 3,928,066, both filed July 25, 1975.

This invention relates to novel, conductive, corrosion-resistant metal films on an insulating substrate. More particularly, this invention relates to a thin, conformal, conductive, corrosion-resistant metal film which has improved adherence to polymeric materials.

BACKGROUND OF THE INVENTION

A novel video recording and playback system has been described by Clemens in U.S. Pat. Nos. 3,842,194 and 3,842,217 incorporated herein by reference. According to this system, video, audio and color information is recorded in the form of geometric variations in a spiral groove on a surface of a disc. Disc replicas, made of an insulating material, such as vinyl, are coated first with a thin, conformal, conductive metal layer as a first electrode of a capacitor, and then with a thin, conformal, dielectric layer. A metal-tipped stylus acts as a second electrode of the capacitor. The stylus monitors changes in capacitance between the stylus and the metal film on the disc as these geometric variations pass beneath the stylus upon rotation of the grooved disc to effect recovery of signals occupying a band width of at least several megahertz, when they are converted back to video, audio and color information suitable for display by a television monitor.

Several metals have been suggested for use as the thin, conductive metal layer. Aluminum was first tried because it is inexpensive, but it was found to be unsatisfactory because it became grainy on storage, leading to high noise levels on playback. Gold was tried and was found to have excellent properties, and is particularly corrosion-resistant, but it is too expensive to use on a large commercial scale. Further, adherence of the dielectric film, particularly glow discharged polymerized styrene, as disclosed in U.S. Pat. No. 3,843,399, to gold surface leaves something to be desired and results in undue wear of the record during playback. Copper was also tried. This metal in thin layers has excellent adherence to polymeric substrates, particularly vinyl compounds, but is not satisfactory because it corrodes rapidly in the atmosphere on storage. Conductive metal alloys of nickel and copper, which are corrosion resistant, have also been tried, but their poor adhesion to organic materials makes them unsuitable for use on the video disc. Thus the search for a thin conductive, adherent, corrosion-resistant metal coating for the video disc has continued.

SUMMARY OF THE INVENTION

We have found that corrosion-resistant alloys of nickel and chromium and, optionally, iron, containing less than about 10% by weight of iron, can be admixed with small amounts of copper and oxygen to form a pseudo-alloy which is conductive, corrosion-resistant and highly adherent to organic dielectric materials, particularly polymeric materials. The pseudo-alloy can be applied to an organic substrate by planar magnetron sputtering of a cathode of the nickel-chromium-iron alloy and copper in an atmosphere containing an inert gas and small amounts of air or oxygen.

DETAILED DESCRIPTION OF THE INVENTION

The nickel-chromium-iron alloy useful herein contains from about 65 to about 80 weight percent of nickel, about 10 to about 30 weight percent of chromium, and from 0 to about 10 weight percent of iron.

The amount of copper to be added to the above-described alloys must be sufficient to impart adherence of the resultant composition both to the polymeric substrates, particularly vinyl, and to polymeric coatings, particularly polymers of styrene, applied by glow discharge techniques. For the present application, an improved adherent metal coating for video discs, the amount of copper must be from about 10 to about 15 atomic percent. However, in order to have sufficient corrosion resistance for the present application, we have found that the pseudo-alloy must also have a certain oxygen content. In general, corrosion resistance increases as the oxygen content increases. However, higher oxygen content also leads to increased oxidation of the metals to form non-conducting compounds, which decreases the conductivity of the film. Thus the upper limit for oxygen content is determined by the resistivity required for the particular application desired. For video discs, the oxygen content should be maintained between about 10 and about 25 atomic percent, preferably about 10 and about 20 atomic percent, of the pseudo-alloy composition.

According to one method of preparing the present films, the organic substrate to be coated with a conductive, corrosion-resistant metal film is placed in a vacuum chamber and connected to a positive source of current, such as a planar magnetron source. The vacuum chamber is also fitted with a negative electrode of the nickel-chromium-iron alloy in which pure copper has been inserted into spaces cut for that purpose. The size and shape of the metallic copper pieces, and their position in the electrode, are chosen so as to sputter the correct amount of copper and so that the copper is uniformly dispersed in the pseudo-alloy, as in known to one skilled in the art. The chamber is then evacuated to a pressure of about $5 \times 10^{-6}$ to $3 \times 10^{-5}$ torr and a small amount of inert gas, such as argon, is fed into the chamber to a pressure of about 15 millitorr. The pressure is not critical and can vary from about 2 to about 100 millitorr. An amount of oxygen is required in the system that will produce about 10 to about 25 atomic percent of oxygen in the metal layer. Oxygen is present as a contaminant in the inert gas and in the residual atmosphere in the vacuum chamber in generally sufficient amounts, but a predetermined amount of oxygen can be deliberately added for more precise control.

When a planar magnetron is employed in the chamber as the source of current, the voltage can be varied from about 300 – 1000 volts and the current can be up to about 10 amperes, depending on the rate of deposition desired and the size of the electrodes.

The current to the alloy-copper electrode is turned on and sputtering continued until a layer about 200 – 400 angstroms thick has been deposited onto the substrate.

The atomic percent of oxygen as employed in the specification and claims is defined as that percentage measured by Auger electron spectroscopy. The absolute value of the oxygen content, $\gamma(0)$, is determined by the following calibration: a pure silver sample is sputter etched to remove about 300 angstroms and the Auger peak to peak magnitude for the Ag doublet (351:356 eV) is recorded. This value is taken to be Δ(Ag). The peak to peak magnitude for the 0 (510) Auger peak in the sample to be measured is taken to be Δ(0). The absolute 0 value is calculated according to the equation:

$$\gamma(0) = \frac{\Delta(0)}{\Delta(Ag)} \times 1.03$$

The factor 1.03 for is obtained from the Handbook of Auger Electron Spectroscopy, Palmberg et al.

The atomic percent of copper in the pseudo-alloy as defined herein is also measured by Auger electron spectroscopy, after removing by sputter etching a layer about 100 angstroms thick. This step eliminates contamination of the surface and preferential sputtering effects. The absolute Cu value is calculated according to the equation:

$$\gamma(Cu) = \frac{\Delta(Cu)}{\Delta(Ag)} \times 4.3 \times 1.5$$

The 4.3 factor for Cu is obtained from the Handbook of Auger Electron Spectroscopy, referred to above.

The 1.5 factor takes into account the copper depletion resulting from preferential sputtering.

The Auger electron spectroscopy results given herein were obtained using a Scanning Auger Microprobe system manufactured by Physical Electronics Industries. The electron beam axis to the sample normal angle was 60°.

The exact mechanism of the combination of improved adhesion and corrosion resistance of the present metal films is unknown, but it is presently believed that the copper serves to stress relieve the nickel-chromium-iron alloy film. As determined by electron spectroscopy for chemical analysis no chemical bonding between the metal layer and/or the organic substrate or coating is involved. The corrosion-resistance is a factor governed by oxidation of the metals present. Analyses show that the chromium and iron in the alloy are oxidized, but only a portion of the nickel is oxidized and the copper remains unoxidized, but thoroughly dispersed in an oxidized, chemically stable matrix. Thus the corrosion resistance of the pseudo-alloy remains high.

The invention will be further illustrated by the following example but it is to be understood that the invention is not meant to be limited to the details described therein. In the example all parts and percentages are by weight unless otherwise noted.

EXAMPLE

A vacuum chamber was fitted with a planar magnetron sputtering electrode made of Inconel-600, an alloy containing 76.8 ± 3% of nickel, 13.8 ± 3% of chromium, and 8.5 ± 2% of iron (plus minor amounts of impurities). The Inconel-600 electrode was 3.56 inches × 8.25 inches (9.04 × 20.96 centimeters). Two slots were machined into the electrode 0.252 inch × 6 inches in size (0.64 × 15.24 centimeters), the first one 1.225 inches (3.11 centimeters) from and parallel to one of the long edges of the electrode and the other 1.245 inches (3.16 centimeters) from and parallel to the other long edge of the electrode. A one-fourth inch (0.64 centimeters) wide copper bar the length of the slot was fitted into the slot so that the edges were flush with the electrode surface. These dimensions were chosen so that the center line of one of the copper bars is in the center of one eroded or sputtered track and the other bar is on the inside edge of the second track in the electrode.

A video disc 12 inches (30.48 centimeters) in diameter was suspended about 2 inches (5.08 centimeters) above the electrode and rotated at 40 rpm.

The chamber was evacuated to a pressure of $3 \times 10^{-6}$ torr and backfilled first with oxygen to a pressure of $1.1 \times 10^{-4}$ torr and then with argon to a total pressure of $1.5 \times 10^{-2}$ torr.

The electrode was then activated with 650 volts and 1.5 amperes of current, resulting in a deposition rate of about 330 to 400 angstroms per minute. Deposition was continued for about 30 seconds or until a layer about 200 angstroms thick had been deposited.

The resultant metal film was tested for adhesion to the disc by storing for 120 hours at 90° F and 90% RH in air and applying scotch tape to the surface. No film was removed when the scotch tape was pulled off.

The film was tested by an accelerated corrosion test as follows: a layer of sodium chloride was evaporated onto the metal coated disc and heated to about 45° C. Air and $H_2S$ were bubbled through water and the gas stream passed continuously over the metal surface. The time was noted when a visible sign of corrosion appeared under a microscope, including color changes, pitting etc. No corrosion was noted after 24 hours.

In comparison, a film of copper alone containing 20 to 23 atomic percent of oxygen pitted severely after about 30 seconds.

The electrical resistance of the metal film was measured using two probes, one in the center of the disc and the other on the outside edge of the disc. The resistance was found to be less than 400 ohms, meeting the requirement for this application.

Stress measurements were made in known manner by depositing films of the pseudo-alloy on very thin aluminum oxide discs and noting the bending of the disc microscopically. Whereas a film of Inconel-600 about 225 angstroms thick had a compressive stress of $30 \times 10^9$ dynes/cm$^2$ a pseudo-alloy coated disc of the invention had a compressive stress of only $5 \times 10^9$ dynes/cm$^2$.

A pseudo-alloy coated vinyl disc as prepared above was coated with a polymer of styrene as follows: a vacuum chamber fitted as above was evacuated to a pressure to about $3 \times 10^{-3}$ torr and backfilled with nitrogen to a pressure of about $3-10 \times 10^{-3}$ torr. Styrene monomer was then added to a pressure of 13 to $15 \times 10^{-3}$ torr. The metal coated disc was suspended about 2 inches (5.08 centimeters) above a planar magnetron source having an electrode 3.5 × 7 inches (8.9 × 17.8 centimeters) in size at a power supply frequency of about 10 kilohertz and a voltage of 680 volts. Power was turned on for 30 seconds and the disc was lowered to face the electrode and rotated at about 40 rpm for 2 minutes so as to deposit a styrene polymer film about 350 angstroms thick.

Compressive stress for the resultant film was only $3 \times 10^9$ dynes/cm$^2$.

We claim:
1. In a capacitive video frequency recording means in the shape of a disc having a spiral groove on a face thereof and video information in the form of geometric variations in said groove, said disc having a thin conductive layer on said face and a thin dielectric layer disposed on said conductive layer, the improvement which comprises employing as the conductive layer a pseudo-alloy about 200 to 400 angstroms thick of an alloy containing from about 65 to about 80 percent by weight of nickel, from about 10 to about 30 percent by weight of chromium and from 0 to about 10% by weight of iron, which pseudo-alloy contains from about 10 to about 15 atomic percent of copper, and from about 10 to 25 atomic percent of oxygen, wherein atomic percent is determined by Auger electron spectroscopy.

2. A recording means according to claim 1 wherein said pseudo-alloy contains from about 10 to about 20 atomic percent of oxygen.

3. A recording means according to claim 1 wherein said disc is of vinyl.

4. A recording means according to claim 1 wherein said dielectric layer is a polymer of styrene.

5. A thin, conductive, corrosion-resistant metal film which comprises a pseudo-alloy of an alloy containing from about 65 to about 80% by weight of nickel, from about 10 to about 30% by weight of chromium, and from 0 to about 10% by weight of iron, which pseudo-alloy contains from about 10 to about 25 atomic percent of oxygen and from about 10 to about 15 atomic percent of copper, wherein atomic percent is determined by Auger electron spectroscopy, said film being from about 200 to 400 angstroms thick.

6. A metal film according to claim 1 wherein said pseudo-alloy contains from about 10 to about 20 atomic percent of oxygen.

7. A metal film according to claim 1 disposed on an organic polymeric substrate.

8. A metal film according to claim 7 having a polymeric coating disposed thereon.

* * * * *